J. H. HALLER.
TRACK CLEANER.
APPLICATION FILED MAY 22, 1912.
1,081,608.
Patented Dec. 16, 1913.
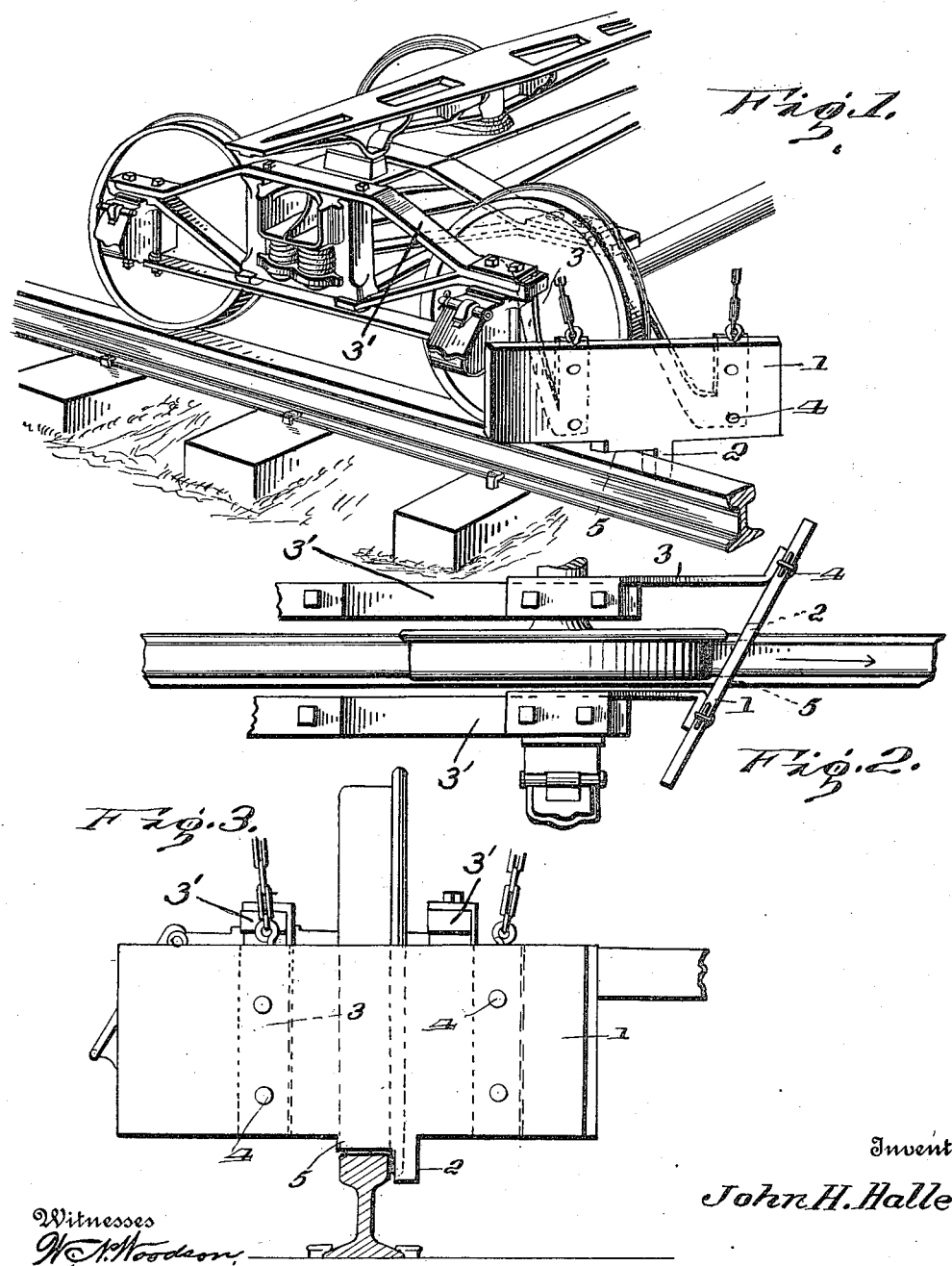

UNITED STATES PATENT OFFICE.

JOHN HENRY HALLER, OF NEW CANAAN, CONNECTICUT.

TRACK-CLEANER.

1,081,608.	Specification of Letters Patent.	Patented Dec. 16, 1913.

Application filed May 22, 1912. Serial No. 699,016.

*To all whom it may concern:*

Be it known that I, JOHN H. HALLER, citizen of the United States, residing at New Canaan, in the county of Fairfield and State of Connecticut, have invented certain new and useful Improvements in Track-Cleaners, of which the following is a specification.

This invention has relation to car fenders, and has for its object to provide a fender of simple and durable structure adapted to be mounted upon the truck frame of a car and positioned in advance of the forward wheels of the truck.

The fender is disposed at an acute angle with relation to the track rails so that when it encounters an obstruction upon the track it will move the same sidewise off of the track.

With the above object in view the fender includes a plate having at its lower edge a lug adapted to move along the side of the head of the rail. This plate is supported in any suitable manner upon the truck frame with the disposition with relation to the rail as hereinbefore stated.

A still further object of the invention is generally to improve this class of devices so as to render them more useful and commercially desirable.

For a full understanding of the invention reference is to be had to the following description and accompanying drawing, in which:—

Figure 1 is a perspective view of part of a truck with the fender applied; Fig. 2 is a top plan view of the fender; Fig. 3 is a perspective view of the fender.

Corresponding and like parts are referred to in the following description and indicated in all the views of the accompanying drawing by the same reference characters.

The fender includes a plate 1 which is provided at its lower edge with a lug 2 adapted to travel along the side of the head of a track rail. Brackets 3, having U-shaped body members, are attached to truss bars 3' of the truck frame, the plate 1 being secured to these brackets by means of countersunk bolts 4. Inasmuch as the truss bars are arranged one upon each side of each pair of wheels of the truck and in parallel relation to the rail upon which said wheels travel, the plate will be suspended immediately over the rail.

The plate 1 is disposed over the head of the track rail at an acute angle to the length of the rail, and the lug 2 is so disposed that its sides are approximately parallel with the sides of the head of the rail. The plate 1 is provided at its lower edge with a shoulder portion 5 which is spaced slightly from the top side of the head of the rail and the side of the lug 2 is spaced slightly from the side of the head of the rail. This shoulder portion 5 does not project beyond the outer side of the head of the rail and consequently while the shoulder portion 5 is comparatively close to the head of the rail the portion of the plate 1 beyond the outer end of the shoulder is elevated at its lower edge so that the fender may pass objects located upon the ground upon the outer sides of the track rail. These objects may be paving blocks, crossing boards, or similar objects which project slightly above the level of the upper side of the head of the track rail. The lug 2 is comparatively thin and consequently will readily pass through switches or any other spaces which will admit the flanges of the wheels. It is of course understood that two of these fenders are used upon the truck, one fender being located over each track rail.

As the car moves along the track the plates 1 will encounter any obstruction that may be upon the rails and sweep the same beyond the outer sides of the track rails. The lug 2 extending along the inner side of the head of the track rail will have a tendency to lift an article or obstruction, which otherwise might be encountered by the flanges of the wheels, and move the same out of the path of the wheel flanges.

While the foregoing description and accompanying drawing set forth the preferred embodiment of my invention, it is to be understood that various changes may be made in the details of construction, arrangement and proportions of the parts without departing from the scope of the invention as defined by the appended claim.

Having thus described the invention, what is claimed as new is:

The combination with truck bars of a wheel truck of a car, said bars extending one upon either side of each wheel, of brackets engaging the truck bars, downwardly and forwardly extending arms formed integrally with said brackets, and a fender plate secured upon the free ends of said arms and extending in a vertical plane, the outer end of the fender plate being directed rearwardly at an angle, said plate being provided at its lower edge with a downwardly formed shoulder substantially equal in width to the width of the tread of a rail and positioned to extend across the same and in close proximity thereto, said shoulder having a downwardly depending lug extending below the tread of the rail and directly in the path of the wheel flange.

In testimony whereof I affix my signature in presence of two witnesses.

JOHN HENRY HALLER. [L. S.]

Witnesses:
 WALTER BARNES,
 MAE E. RUTLEDGE.

Copies of this patent may be obtained for five cents each, by addressing the "Commissioner of Patents, Washington, D. C."